US009901817B2

(12) United States Patent
Yamaguchi et al.

(10) Patent No.: US 9,901,817 B2
(45) Date of Patent: Feb. 27, 2018

(54) NON-TRANSITORY COMPUTER-READABLE RECORDING MEDIUM, AND INFORMATION PROCESSING DEVICE

(71) Applicant: DENA CO., LTD., Tokyo (JP)

(72) Inventors: Kyohei Yamaguchi, Tokyo (JP); Tatsuya Koyama, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 98 days.

(21) Appl. No.: 15/033,584

(22) PCT Filed: Oct. 15, 2014

(86) PCT No.: PCT/JP2014/077428
§ 371 (c)(1),
(2) Date: Apr. 29, 2016

(87) PCT Pub. No.: WO2015/064362
PCT Pub. Date: May 7, 2015

(65) Prior Publication Data
US 2016/0271491 A1    Sep. 22, 2016

(30) Foreign Application Priority Data
Oct. 31, 2013    (JP) .................................. 2013-226506

(51) Int. Cl.
*A63F 9/24* (2006.01)
*A63F 13/2145* (2014.01)
(Continued)

(52) U.S. Cl.
CPC .......... *A63F 13/2145* (2014.09); *A63F 13/42* (2014.09); *A63F 13/53* (2014.09);
(Continued)

(58) Field of Classification Search
CPC ............................... A63F 13/58; A63F 13/822
See application file for complete search history.

(56) References Cited

U.S. PATENT DOCUMENTS

| 6,755,743 B1 * | 6/2004 | Yamashita | ............ A63F 13/005 |
| | | | 463/40 |
| 7,582,018 B2 * | 9/2009 | Hata | ....................... A63F 13/10 |
| | | | 463/1 |

(Continued)

FOREIGN PATENT DOCUMENTS

| JP | 2005-034277 | 2/2005 |
| JP | 2005-342266 | 12/2005 |
| JP | 5270022 | 8/2013 |

OTHER PUBLICATIONS

Notice of Reasons for Rejection dated Apr. 22, 2014, for JP App No. 2013-226506, 4 pgs.

(Continued)

*Primary Examiner* — James S McClellan
*Assistant Examiner* — Kevin Carter
(74) *Attorney, Agent, or Firm* — Procopio, Cory, Hargreaves & Savitch LLP

(57) ABSTRACT

The game program pertaining to the present invention receives selection operation input from a player by having the player select one of a plurality of characters. Then, it is determined whether the received selection operation input is a first selection operation input or a second selection operation input, and if the first selection operation input has been received, the character selected by the player is configured as a selectable object and a first action is configured for the character that is a selectable object, and if the second selection operation input has been received, the character selected by the player is configured as a selectable object and a second action that is different from the first action is configured for the character that is a selectable object.

6 Claims, 9 Drawing Sheets

(51) Int. Cl.
*A63F 13/42* (2014.01)
*A63F 13/53* (2014.01)
*A63F 13/822* (2014.01)
*H04M 1/725* (2006.01)

(52) U.S. Cl.
CPC ....... *A63F 13/822* (2014.09); *H04M 1/72544* (2013.01); *H04M 2250/22* (2013.01)

(56) References Cited

U.S. PATENT DOCUMENTS

| | | | |
|---|---|---|---|
| 9,137,086 B1* | 9/2015 | Naik | H04L 29/0602 |
| 2004/0128319 A1* | 7/2004 | Davis | A63F 13/12 |
| 2005/0021159 A1* | 1/2005 | Ogawa | A63F 13/12 700/91 |
| 2006/0287099 A1* | 12/2006 | Shaw | A63F 13/12 463/42 |
| 2007/0207860 A1* | 9/2007 | Yamauchi | A63F 13/12 463/42 |
| 2008/0076498 A1* | 3/2008 | Yoshinobu | A63F 13/10 463/9 |
| 2009/0280909 A1* | 11/2009 | McEniry | A63F 13/12 463/42 |
| 2011/0250957 A1* | 10/2011 | Suzuki | A63F 13/12 463/30 |
| 2012/0046105 A1* | 2/2012 | Yamaguchi | A63F 13/828 463/37 |
| 2014/0066199 A1 | 3/2014 | Takagi et al. | |

OTHER PUBLICATIONS

International Search Report for PCT App No. PCT/JP2014/077428 dated Jan. 13, 2015, 3 pgs.

Totori, A., Alchemist of Arland 2 The Complete Guide, ASCII Media Works Inc., Mar. 4, 2011, 2nd Ed., No. 60, 5 pgs.

* cited by examiner

| Game ID | Game title | Game program | Game data |
|---------|------------|--------------|-----------|
| 0001 | ○○○○ | ○○○○.apk | ○○○○ |
| . . . | . . . | . . . | . . . |

FIG. 3

| Player ID | Player name | Game ID | Game data |
|-----------|-------------|---------|-----------|
| 0001 | ○○○○ | 0001 | ○○○○ |
|  |  | 0005 | ○○○○ |
|  |  | . | ○○○○ |
| . . . | . . . | . . . | . . . |

FIG. 4

| Character ID | Character name | Attack Strength | Defense Strength | Hit points | Skill 1 | Skill 2 | Skill 3 | Skill parameter |
|---|---|---|---|---|---|---|---|---|
| 0011 | Character A | 15 | 10 | 200 | Lethal technique A1 | Lethal technique A2 | Lethal technique A3 | 500 |
| 0211 | Character B | 20 | 23 | 150 | Lethal technique B1 | Lethal technique B2 | Lethal technique B3 | 200 |
| ... | ... | ... | ... | ... | ... | ... | ... | ... |

FIG. 6

| Enemy character ID | Enemy character name | Attack Strength | Defense Strength | Hit points |
|---|---|---|---|---|
| 0001 | Enemy character A | 150 | 80 | 100 |
| 0002 | Enemy character B | 300 | 200 | 150 |
| 0003 | Enemy character C | 450 | 300 | 250 |
| 0004 | Enemy character D | 600 | 550 | 600 |
| ... | ... | ... | ... | ... |

FIG. 7

NON-TRANSITORY COMPUTER-READABLE RECORDING MEDIUM, AND INFORMATION PROCESSING DEVICE

This application is a National Stage entry of PCT/JP2014/077428, filed on Oct. 15, 2014, which claims the benefit of foreign priority under 35 USC 119(e) based on Japan Patent Application No. 2013-226506, filed on Oct. 31, 2013, the contents of which is incorporated herein in its entirety by reference.

TECHNICAL FIELD

The present invention relates to a non-transitory computer-readable recording medium, and to an information processing device.

BACKGROUND ART

There are known game programs in which a selection operation input is received from a player, a character selected by the player from among a plurality of characters is placed in a character placement area, and then the player selects either a recovery button for recovering the hit point parameter of the character or a battle button for directing that character engage in battle, so that the selection operation input is received from the player, and the hit point parameter of the character is recovered or the character is directed to engage in battle (see Patent Document 1, for example).

PRIOR ART DOCUMENTS

Patent Documents

Patent Document 1: Japanese Patent No. 5,270,022

SUMMARY OF THE INVENTION

Problems to be Solved by the Invention

With such a game program, the player was required to perform selection operations for the selection of a character and the selection of an action for that character, respectively.

The present invention was conceived in light of this situation, and it is an object thereof to make the selection operations performed by the player easier.

Means for Solving the Problems

In order to solve the above and other problems, the main aspect of the present invention is a computer-readable recording medium that continuously stores a game program that is executed by a computer comprising a processor and a memory, wherein the game program causes the computer to execute:

screen generation processing to generate a game screen including a character placement area in which a plurality of characters that can be selected by a player are placed;

reception processing to receive selection operation input from the player by having the player select one of the plurality of characters when the character placement area is being displayed on the game screen;

determination processing to determine whether the received selection operation input is a first selection operation input or a second selection operation input; and selected character configuration processing to configure the character selected by the player as a selectable object and configure a first action for the character that is a selectable object, when it has been determined that the first selection operation input has been received, and to configure the character selected by the player as a selectable object and configure a second action that is different from the first action for the character that is a selectable object, when it has been determined that the second selection operation input has been received.

Other features of the present invention will become apparent from this Specification and the accompanying Drawings.

BRIEF DESCRIPTION OF THE DRAWINGS

FIG. 3 A table illustrating an example of the data structure of game information.
FIG. 4 A table illustrating an example of the data structure of player information.
FIG. 6 A table illustrating an example of the data structure of player character information.
FIG. 7 A table illustrating an example of the data structure of enemy character information.

Mode for Carrying Out the Invention

Figure 1:
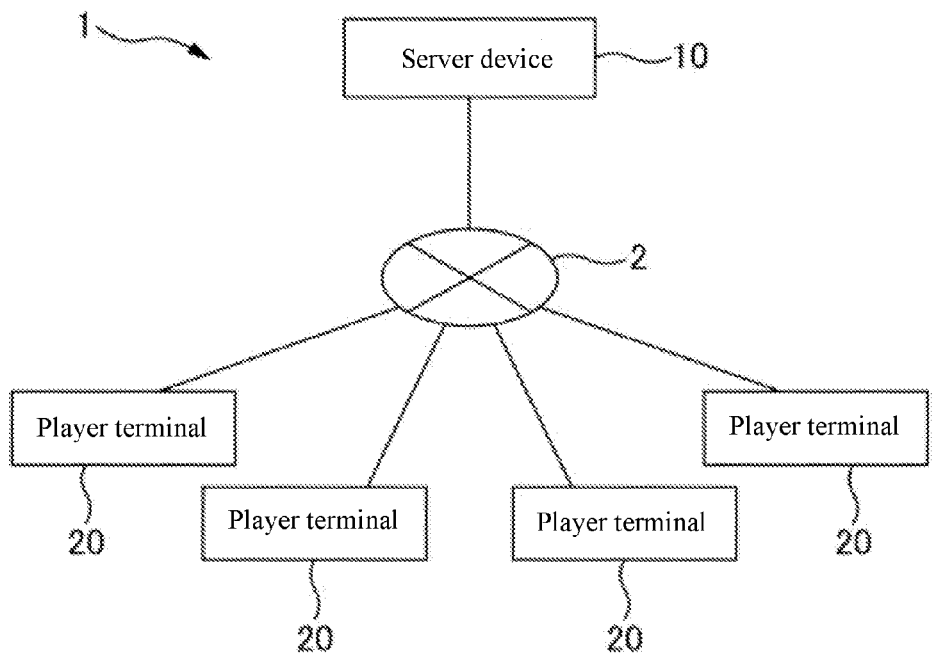
FIG. 1 A diagram illustrating an example configuration of the entire game system 1.

At least the following will be apparent from this Specification and the accompanying Drawings.

Namely, a computer-readable recording medium that continuously stores a game program that is executed by a computer comprising a processor and a memory, wherein the game program causes the computer to execute:

screen generation processing to generate a game screen including a character placement area in which a plurality of characters that can be selected by a player are placed;

reception processing to receive selection operation input from the player by having the player select one of the plurality of characters when the character placement area is being displayed on the game screen;

determination processing to determine whether the received selection operation input is a first selection operation input or a second selection operation input; and selected character configuration processing to configure the character selected by the player as a selectable object and configure a first action for the character that is a selectable object, when it has been determined that the first selection operation input has been received, and to configure the character selected by the player as a selectable object and configure a second action that is different from the first action for the character that is a selectable object, when it has been determined that the second selection operation input has been received.

With a game program such as this, selection of the character and selection of the action for that character can be performed by the player with a single selection operation, and this facilitates the selection operations performed by the player.

In addition, this game program may be adapted such that the screen generation processing generates a game screen that differentiates characters that satisfy a specific condition with characters that do not satisfy the specific condition in the character placement area, the determination processing determines whether or not the received second selection operation input is a selection operation input for selecting characters that satisfy the specific condition from among characters that satisfy the specific condition and characters that do not satisfy the specific condition, the selected character configuration processing configures as a selectable object the character that satisfies the specific condition selected by the player and configures the second action for the character that is a selectable object, when it has been determined that the selection operation input is to select a character that satisfies the specific condition, and does not configure as a selectable object the character that does not satisfy the specific condition selected by the player, when it has been determined that the selection operation input is to select a character that does not satisfy the specific condition.

With a game program such as this, since characters that satisfy the specific condition and characters that do not satisfy the specific condition are differentiated in the display, the player can perform the selection operations with ease.

In addition, this game program may be adapted such that, when one of the plurality of characters placed in the character placement area has satisfied the specific condition, the screen generation processing performs a special display indicating that said character has satisfied the specific condition.

With a game program such as this, the player can be instantly apprised of the fact that a character satisfies the specific condition.

In addition, this game program may be adapted such that the screen generation processing generates a game screen that includes a game field area in which the characters determined as selectable objects are placed until the maximum number is reached, the selected character configuration processing enables cancellation of the selection of the characters configured as selectable objects until the characters placed in the game field area reach the maximum number, and once the characters placed in the game field area have reached the maximum number, the characters configured as selectable objects is confirmed, and the first action or the second action configured for each character is confirmed.

With a game program such as this, once the maximum number of characters determined to be selectable objects is reached, the selection of those characters is confirmed, and the selection of an action for those characters is also confirmed, so the player does not have to perform any special operations to confirm this selection setting, which means that operation is further facilitated.

Next, an information processing device, comprising:

a screen generation processing module that generates a game screen including a character placement area in which a plurality of characters that can be selected by a player are placed;

a reception processing module that receives selection operation input from the player by having the player select one of the plurality of characters when the character placement area is being displayed on the game screen;

a determination processing module that determines whether the received selection operation input is a first selection operation input or a second selection operation input; and a selected character configuration processing module that configures the character selected by the player as a selectable object and configures a first action for the character that is a selectable object, when it has been determined that the first selection operation input has been received, and that configures the character selected by the player as a selectable object and configures a second action that is different from the first action for the character that is a selectable object, when it has been determined that the second selection operation input has been received.

With an information processing device such as this, the selection operations performed by the player can be facilitated.

EMBODIMENTS

<<Configuration of Game System 1>>

FIG. 1 is a diagram illustrating an example configuration of the entire game system 1 according to the present embodiment. The game system 1 provides various game-related services to the player over a network 2 (for example, the Internet) and includes a server device 10 and multiple player terminals 20.

<<Configuration of Server Device 10>>

Figure 2:
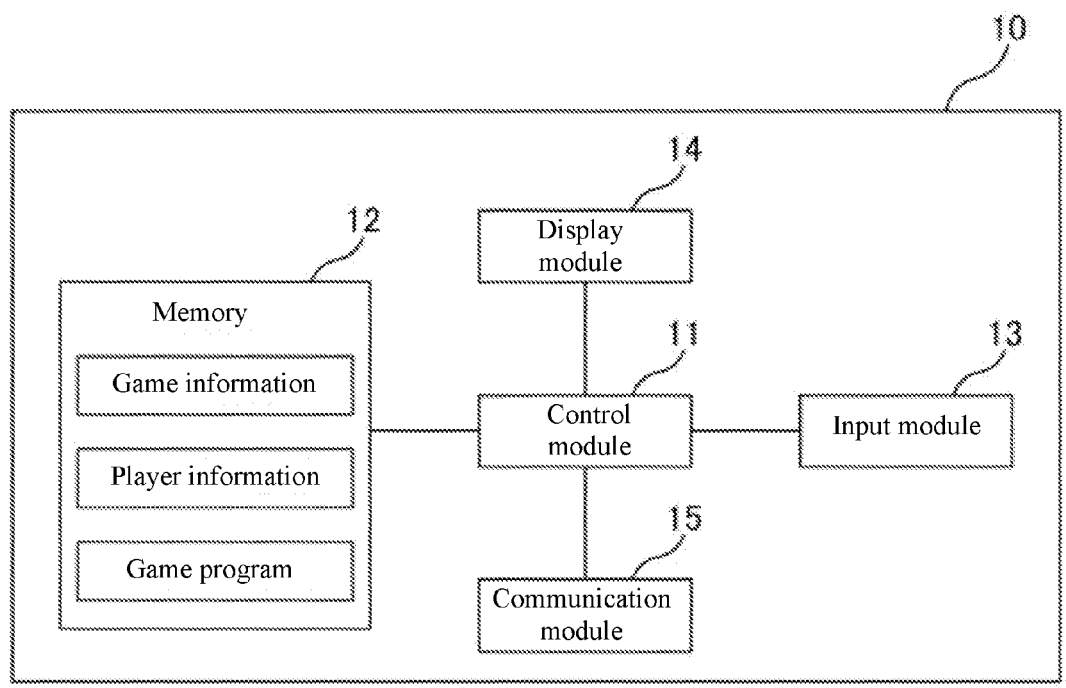
FIG. 2 A block diagram illustrating the functional configuration of a server device 10.

FIG. 2 is a block diagram illustrating the functional configuration of the server device 10 according to the present embodiment. The server device 10 is an information processing device (for example, a workstation, a personal computer, etc.) used by a system administrator, etc. to operate and manage game services and, upon receiving various commands (requests) from player terminals 20, the server device 10 can distribute (respond with) game programs operational on the player terminals 20 and web pages (game screens, etc.) created using a markup language (HTML, etc.) compliant with the specifications of the player terminals 20. The server device 10 has a control module 11, a memory 12, an input module 13, a display module 14, and a communication module 15.

The control module 11, along with transferring data between the components, exercises overall control over the server device 10, and is implemented using a CPU (Central Processing Unit) that runs a predetermined program stored in memory.

The memory 12 has a ROM (Read Only Memory), which is a read-only storage area where operating system software is stored, and a RAM (Random Access Memory), which is a rewritable storage area used as a work area for arithmetic processing by the control module 11, and is implemented as a non-volatile storage device, such as a flash memory, a hard disk, or the like. The memory 12 in this embodiment stores at least game information that is information related to game programs (game apps) that can be provided to a player, player information that is information related to a player, and game programs (game apps).

FIG. 3 is a table illustrating an example of the data structure of game information stored in the memory 12 of the server device 10. This game information has categories such as game ID, game title, game program, and game data. A game ID is identification information that identifies a game program (game app). A game title is information indicating the displayed name of the game app provided to the player. A game program is information indicating a program file. Game data is information indicating data related to the game program. Because multiple types of game apps are thus configured in the game information, the player can download the desired game app by operating the player terminal 20 to access the server device 10.

FIG. 4 is a table illustrating an example of the data structure of player information stored in the memory 12 of the server device 10. This player information has categories such as player ID, player name, game ID, and game data. A player ID is identification information that identifies a player. A player name is information indicating the displayed name of the player. A game ID is identification information identifying the game apps owned by the player (downloaded game apps). Game data is information indicating player data related to the game apps owned by the player (such as the level and other such parameters).

The input module 13 is used by a system administrator, etc. for entering various types of data (for example, game information, etc.), and is implemented, for example, using a keyboard, a mouse, or the like.

The display module 14, which is used for displaying operation screens used by the system administrator in response to commands from the control module 11, is implemented, for example, as an LCD (Liquid Crystal Display), or the like.

The communication module 15, which is used for communication with the player terminals 20, has receiver functionality for receiving various types of data and signals transmitted from the player terminals 20 and transmitter functionality for transmitting various types of data and signals to the player terminals 20 in response to commands from the control module 11.

<<Configuration of Player Terminal 20>>

Figure 5:
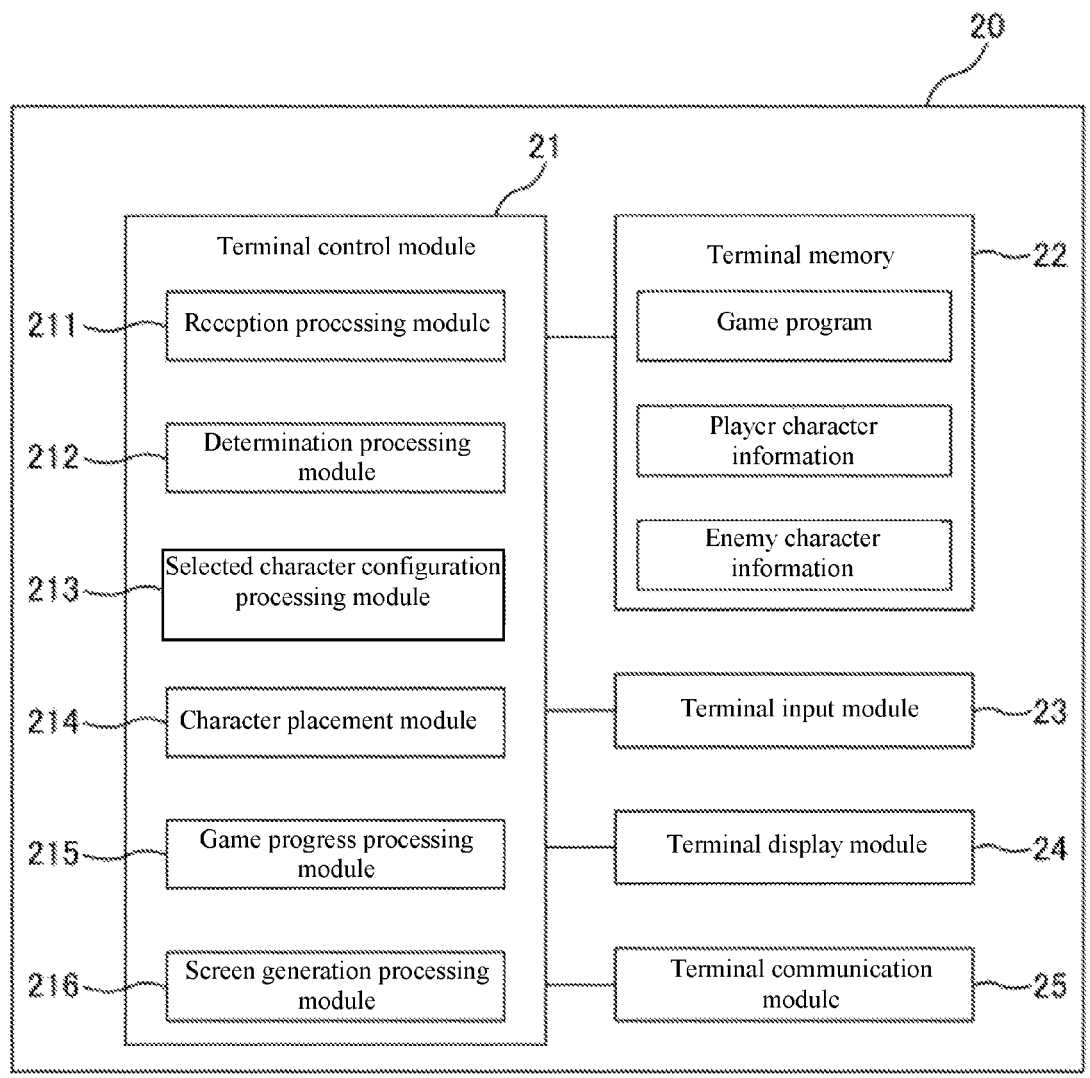
FIG. 5 A block diagram illustrating the functional configuration of a player terminal 20.

FIG. 5 is a block diagram illustrating the functional configuration of a player terminal 20. The player terminal 20 in this embodiment is an information processing device (for example, a portable telephone terminal, a smart phone, a tablet terminal, etc.) used by the player to play a game, and can request the server device 10 to send various information related to the game (game program, game data, etc.). This player terminal 20 has a terminal control module 21, a terminal memory 22, a terminal input module 23, a terminal display module 24, and a terminal communication module 25.

The terminal control module 21, along with transferring data between the components, exercises overall control over the player terminal 20, and is implemented using a CPU (Central Processing Unit) that runs a predetermined program stored in memory. The terminal control module 21 in this embodiment comprises a reception processing module 211, a determination processing module 212, a selected character configuration processing module 213, a character placement module 214, a game progress processing module 215, and a screen generation processing module 216.

The reception processing module 211 possesses functionality to carry out processing to receive operation commands based on various operations performed by the user. The reception processing module 211 in this embodiment can receive the selection of a character and the selection of an action for that character in a single selection operation input.

The determination processing module 212 possesses functionality to carry out various kinds of determination processing. The determination module 212 in this embodiment determines, for example, whether the selection operation input received by the reception processing module 211 is a first selection operation input or a second selection operation input.

The selected character configuration processing module 213 possesses functionality to carry out processing to perform various kinds of configuration related to characters. The selected character configuration processing module 213 in this embodiment configures the character selected by the player as a selectable object, and configures a specific action for the character that is a selectable object, when the reception processing module 211 has received a single selection operation input, for example.

The character placement module 214 possesses functionality to carry out processing to display a plurality of characters in a game field area and in a character placement area. The character placement module 214 in this embodiment places characters that are selection candidates in the character placement area, and places a character selected by the player from among the characters placed in the character placement area in the game field area.

The game progress processing module 215 possesses functionality to carry out processing to advance the game according to the game program. The game progress processing module 215 in this embodiment possesses functionality to carry out battle processing to make the player character selected by the player engage in battle against an enemy character (battle adversary).

The screen generation processing module 216 possesses functionality to carry out processing to generate screen data for displaying a game screen on the terminal display module 24. The screen generation processing module 216 in this embodiment generates screen data for displaying game screens, including, for example, a game field area, a character placement area, player characters, enemy characters, and so forth, on the terminal display module 24.

The terminal memory 22 is connected to the terminal control module 21 via a bus, and processing for referring to, reading, and rewriting the stored data is performed according to commands from the terminal control module 21. This terminal memory 22 is realized by a flash memory, a hard disk, or the like, for example. The terminal memory 22 in this embodiment at least stores game programs downloaded from the server device 10 (such as game apps for battle games), and player character information or enemy character information downloaded from the server device 10.

FIG. 6 is a table illustrating an example of the data structure of player character information stored in the terminal memory 22 of the player terminal 20. This player character information has categories (fields) such as character ID, character name, attack strength, defense strength, hit points, skill 1, skill 2, skill 3, and skill parameters. Character ID is identification information that identifies a player character owned by the player. Character name is information indicating the display name of a player character. Attack strength, defense strength, and hit points are parameters indicating ability values configured for the player character. Skill 1, skill 2, and skill 3 are examples of actions configured for a player character, and are skill information such as a lethal technique that can be used by a player character. When a player character exercises a lethal technique (special attack), the attack strength, defense strength, and other such parameters are configured higher than their initial values or current values, and allow the battle against an enemy character to proceed advantageously. A skill parameter is a parameter for exercising a lethal technique (special attack). A player character can exercise a lethal technique (special attack) when a skill parameter reaches its maximum value.

FIG. 7 is a table illustrating an example of the data structure of enemy character information stored in the terminal memory 22 of the player terminal 20. This enemy character information has categories (fields) such as enemy character ID, enemy character name, attack strength, defense strength, and hit points. Enemy character ID is identification information that identifies an enemy character that will be faced in battle. Enemy character name is information indicating the display name of an enemy character. The attack strength, defense strength, and hit points of an enemy character are parameters indicating ability values configured for the enemy character.

<<Game Overview>>

An overview of the game provided by the game system 1 of this embodiment is provided below. With this game system 1, the player terminals 20 install game programs downloaded from the server device 10, after which these game programs are executed, allowing the players to engage in game play.

In the following description, we will assume that a player terminal 20 executes a game program related to a battle game, and will describe an example in which the terminal input module 23 of the player terminal 20 is a touch panel. The present invention can also be applied to game devices having a controller.

<Battle Game>

With the battle game in this embodiment, the player selects a player character from among the player characters he owns, and can make this player character engage in battle with an enemy character (battle adversary). A battle game victory is decided by the various parameters configured for the player character and the enemy character (attack strength, defense strength, hit points, etc.). In this embodiment, up to three player characters can be selected from among the plurality of player characters owned by the player to engage in battle with enemy characters.

<Player Character Selection Operations>

With the battle game in this embodiment, the player operates the touch panel to select a player character to engage in battle against an enemy character. More specifically, the player operates the touch panel in a state in which a game field area, which serves as the battleground for engaging in battle with the enemy character, and a character placement area, in which a plurality of player characters that serve as selection candidates are placed, are displayed on the game screen, and the selection of a player character is performed by moving one of the player characters located in the character placement area to the game field area.

With the battle game in this embodiment, when a player character selection operation is to be performed, the player can selectively perform a first selection operation for making that player character perform a special attack, and a second selection operation for making that player character perform an ordinary attack.

When the player uses the touch panel to perform a first selection operation, the player character selected by the player is configured as a selectable object, and a special attack (first action) is configured for that player character. On the other hand, when the player uses the touch panel to perform a second selection operation, the player character selected by the player is configured as a selectable object, and an ordinary attack (second action) is configured for that player character.

In this embodiment, when the touch panel is used by the player to flick a player character located in the character placement area (by touching the screen and sliding one's finger over), the player is determined to have performed a first selection operation. Alternatively, when the touch panel is used by the player to tap a player character located in the character placement area (by touching a finger to the screen for just an instant), the player is determined to have performed a second selection operation.

Thus, the player can simultaneously perform the selection of a player character and the selection of an action for that player character merely by performing a single selection operation. Also, the player can give a different action to the same player character merely by choosing which selection operation to use, even though the same player character is selected. Thus, the player does not have to go to the trouble of differentiating in the selection of a player character and the selection of an action for that player character, so the selection operations performed by the player can be facilitated.

<Screen Transitions Related to Selection Operations>

Figure 8:
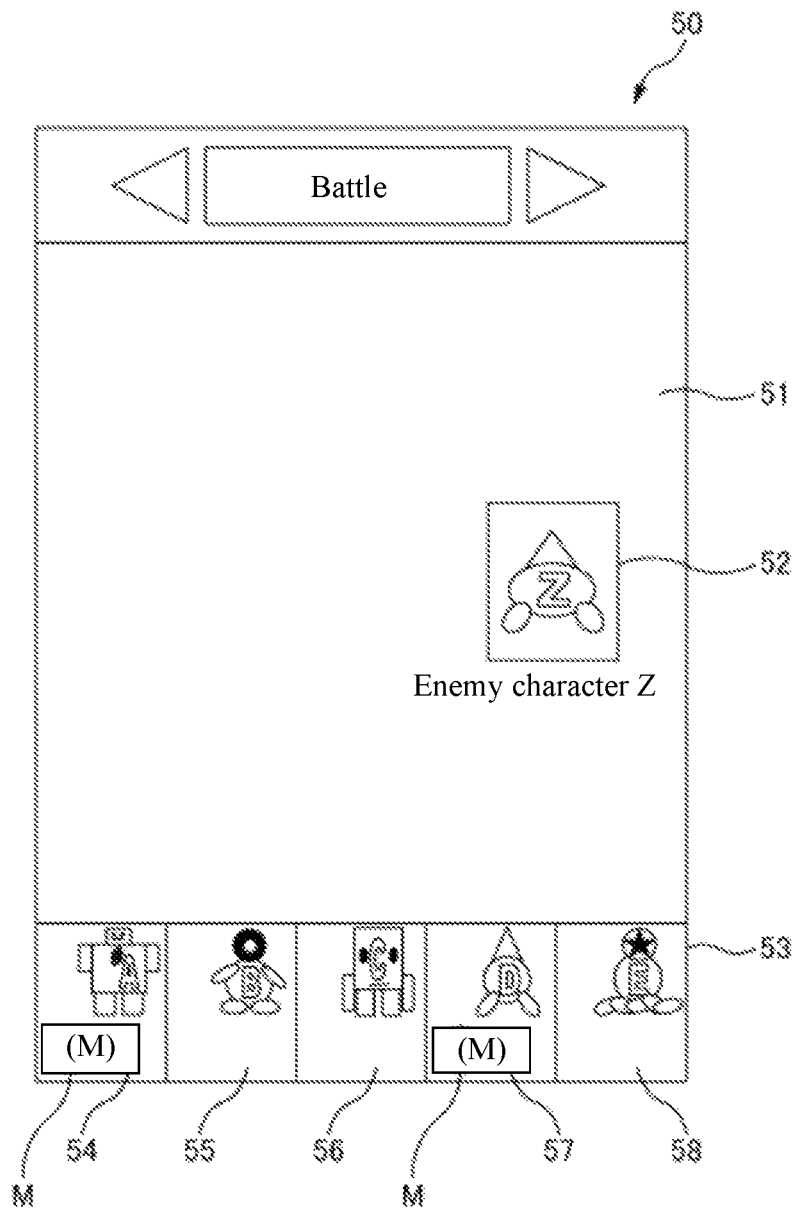
FIG. 8 A diagram illustrating an example of a game screen 50.

FIG. 8 is a diagram illustrating an example of a game screen 50. On the game screen 50 are displayed a game field area 51, an enemy character 52, and a character placement area 53. The enemy character 52 that becomes a battle adversary is displayed in the game field area 51. Five player characters 54 to 58 that become selection candidates are displayed in the character placement area 53. The player characters 54 to 58 are selected from among the characters owned by the player. A mark M indicating that a special attack can be deployed is affixed to the player characters 54 and 57. The mark M is affixed when the skill parameter configured for the player characters 54 and 57 has reached its maximum value.

In this embodiment, the player uses the touch panel to select three player characters to engage in battle with the enemy character 52, from among the five player characters 54 to 58 placed in the character placement area 53.

Figure 9:
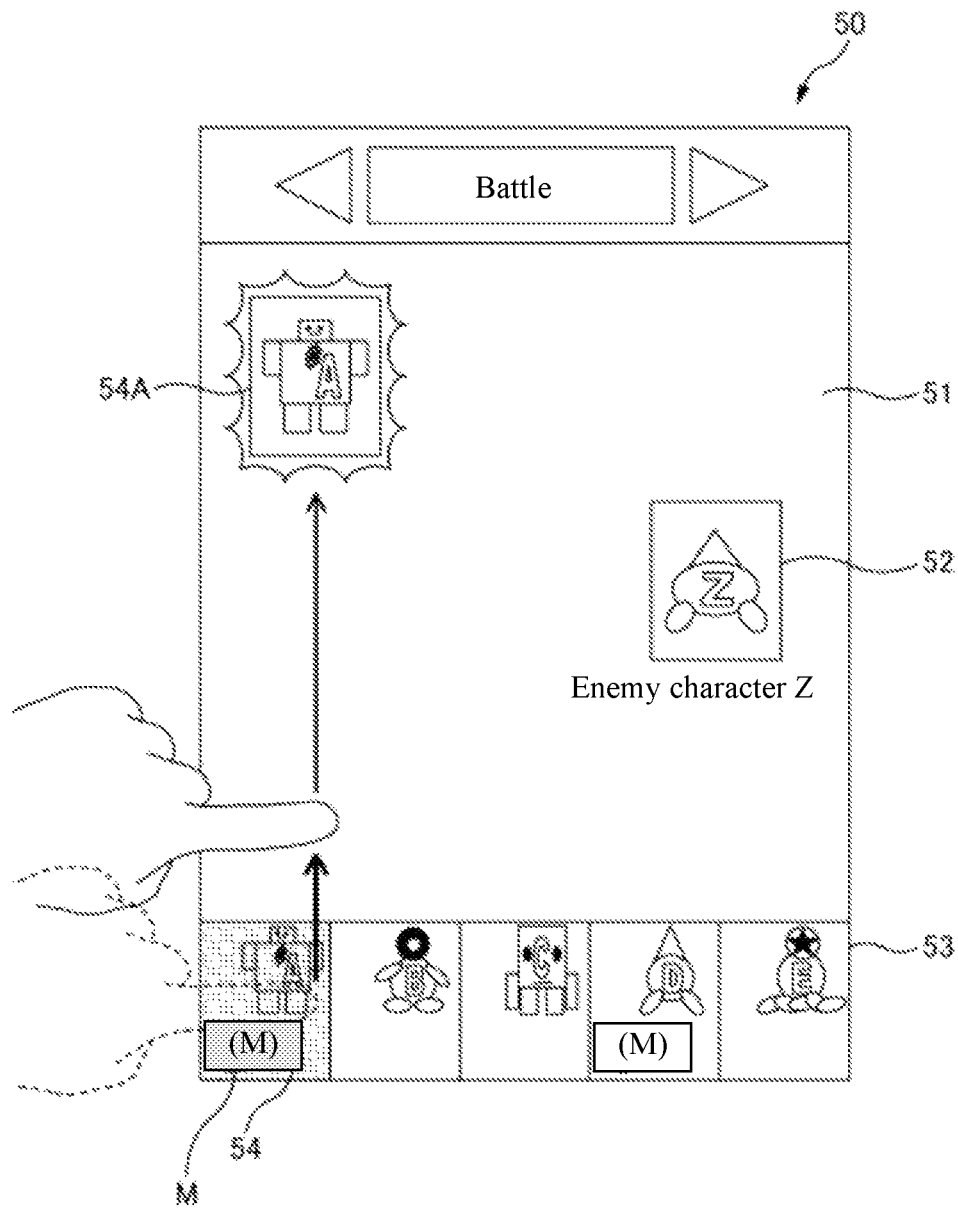
FIG. 9 A diagram illustrating an example of a first selection operation (special attack operation).

FIG. 9 is a diagram illustrating an example of a first selection operation (special attack operation). In FIG. 9, let us first describe what happens when the first player character 54 is selected. Since the mark M is affixed to this player character 54, it is in a state of being able to deploy both an ordinary attack and a special attack. Here, when the player performs a first selection operation, the player character 54 is configured as a selectable object, and a special attack is configured for that player character 54. The first selection operation is performed by touching the player character 54 displayed on the game screen 50 and sliding. When the player lifts the sliding finger from the game screen 50, the player character 54 moves from the character placement area 53 and is placed in the game field area 51. Since a special attack is configured for the player character 54A placed in the game field area 51, the display is highlighted to indicate this. In this state, the player can cancel the selection of the player character 54A by tapping the selected player character 54 in the character placement area 53. Once the selection is cancelled, the player character 54A moves from the game field area 51 and is placed in its original position in the character placement area 53.

Figure 10:
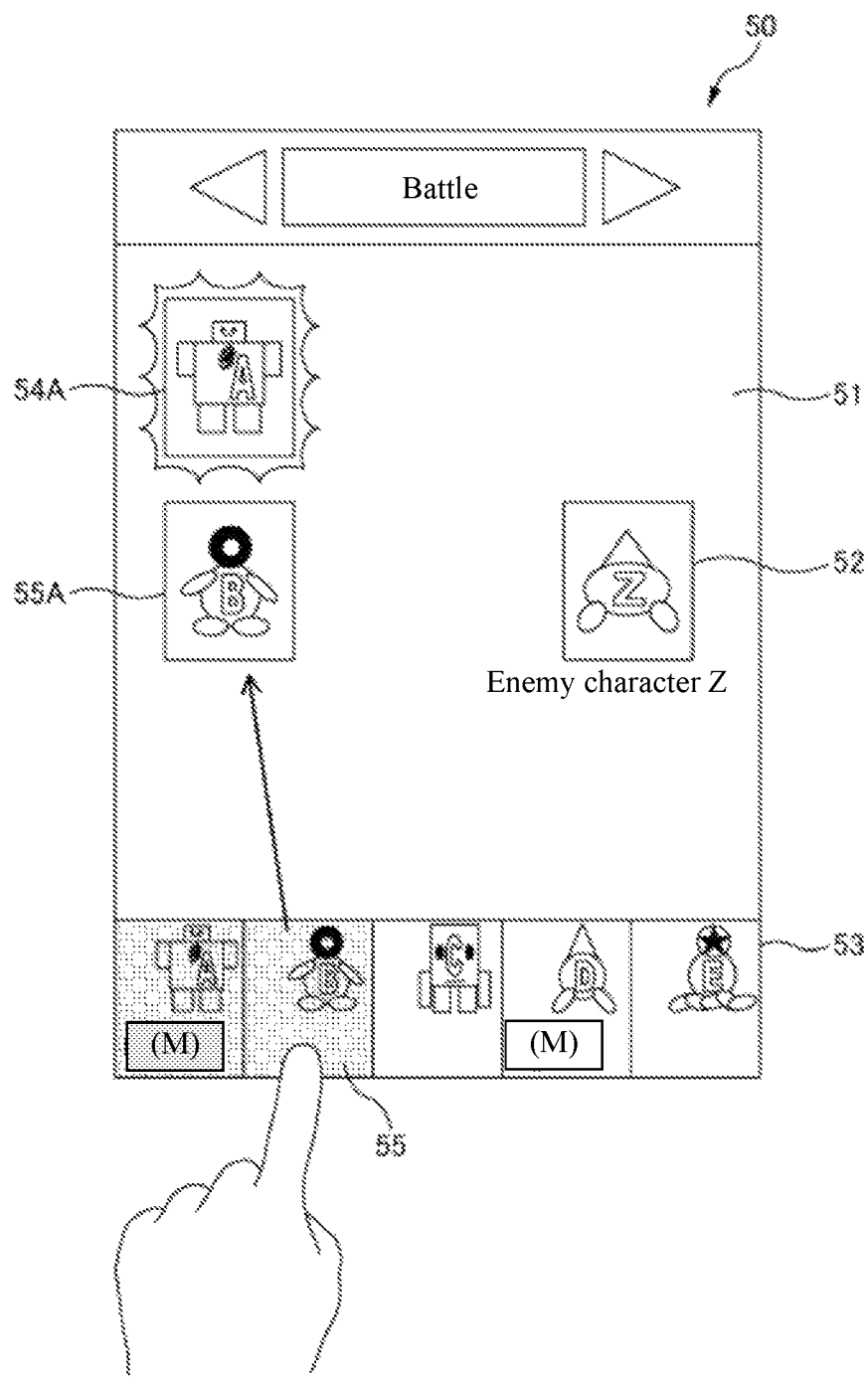
FIG. 10 A diagram illustrating an example of a second selection operation (ordinary attack operation).

FIG. 10 is a diagram illustrating an example of a second selection operation (ordinary attack operation). In FIG. 10, let us describe what happens next, when the second player character 55 is selected. Since no mark M is affixed to this player character 55, it is only capable of deploying an ordinary attack. Here, when the player performs the second selection operation, the player character 55 is configured as a selectable object, and an ordinary attack is configured for that player character 55. The second selection operation is performed by tapping the player character 55 displayed on the game screen 50. When the player lifts his finger from the game screen 50, the player character 55 moves from the character placement area 53 and is placed under the player character 54A in the game field area 51. In this state, the player can cancel the selection of the player character 55A by again tapping the selected player character 55 in the character placement area 53. Once the selection is cancelled, the player character 55A moves from the game field area 51 and is placed in its original position in the character placement area 53.

Figure 11:
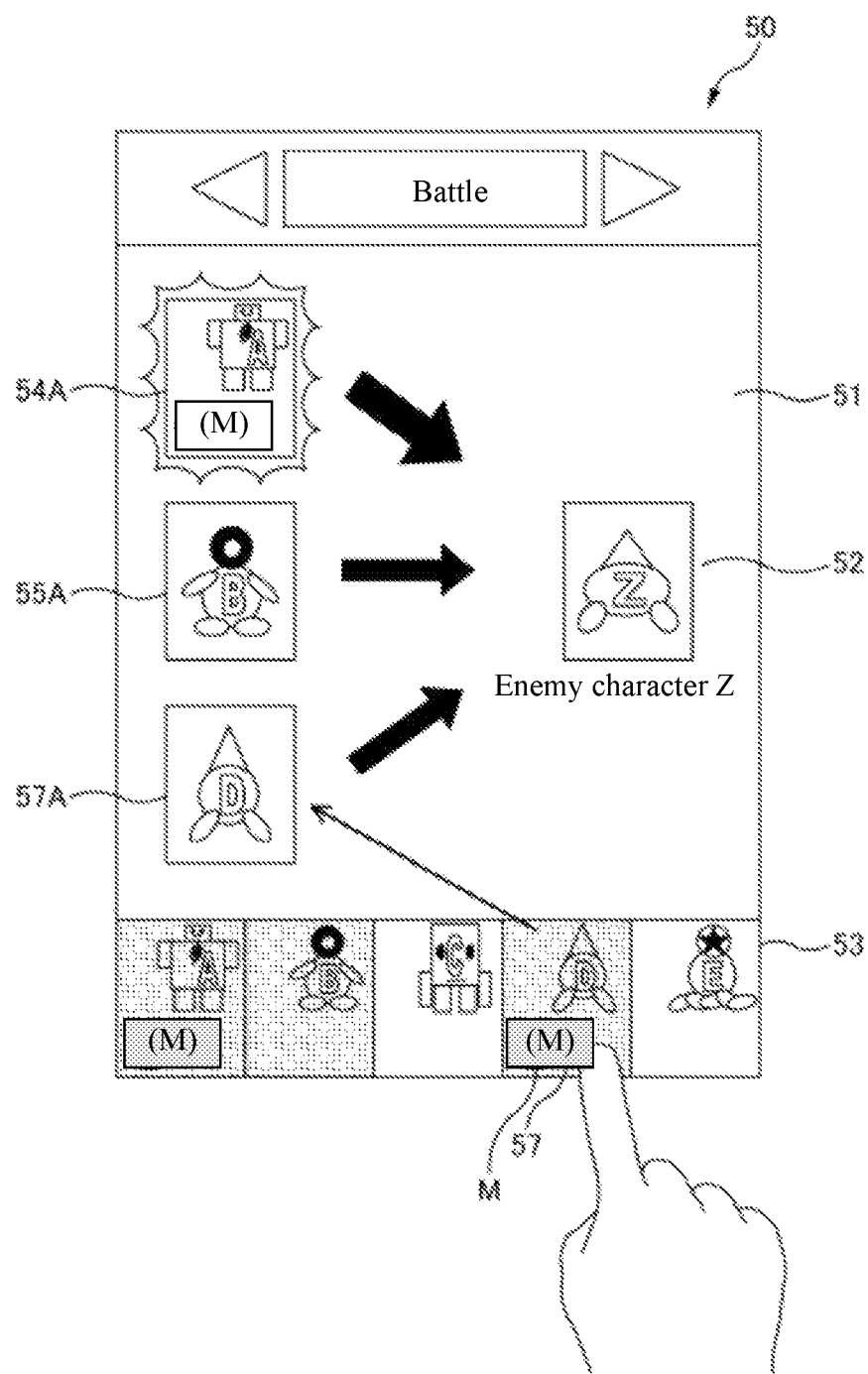
FIG. 11 A diagram illustrating an example of the second selection operation (ordinary attack operation).

FIG. 11 is a diagram illustrating an example of the second selection operation (ordinary attack operation). In FIG. 11, let us describe what happens last, when the third player character 57 is selected. Since the mark M is affixed to this player character 57, it is capable of deploying both an ordinary attack and a special attack. Here, when the player performs the second selection operation, the player character 57 is configured as a selectable object, and an ordinary attack is configured for that player character 57. As discussed above, the second selection operation is performed by tapping the player character 57 displayed on the game screen 50. When the player lifts his finger from the game screen 50, the player character 57 moves from the character placement area 53 and is placed under the player character 55A in the game field area 51. Since an ordinary attack, rather than a special attack, has been configured for the player character 57A placed in the game field area 51, this character is not highlighted like the player character 54A. Simultaneously with the selection of the player character 57, selections of the player character 54A, the player character 55A, and the player character 57A are all confirmed, and the selections of the actions for the player character 54A, the player character 55A, and the player character 57A are confirmed. Right after this, the attacks configured for each player character are automatically begun against the enemy character 52 in the order of player character 54A, the player character 55A, and the player character 57A.

Thus, in this embodiment, the player character 57 differs from the player character 54 and the player character 55 in that its selection cannot be cancelled. However, the selection of all the player characters and the selection of their attacks are confirmed simultaneously with the selection of the player character 57, and attacks against the enemy character 52 are begun automatically, so the player does not have to go to the trouble of starting an attack (for example, does not have to press a button to start an attack), so operation can be facilitated.

<<Operation of Player Terminal 20>>

Figure 12:
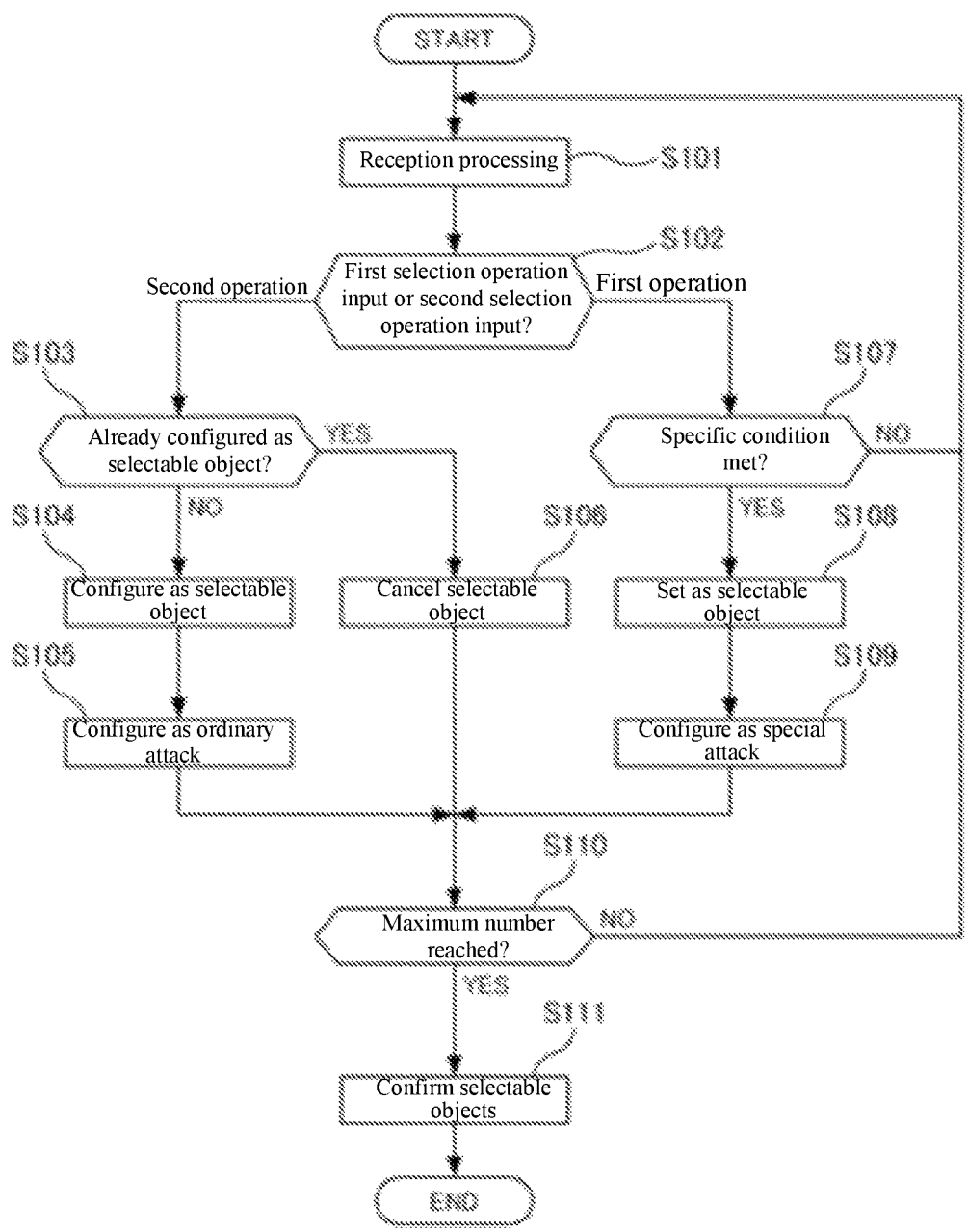
FIG. 12 A flowchart illustrating the processing related to character selection.

FIG. 12 is a flowchart illustrating the processing related to character selection.

First, when the game screen 50 shown in FIG. 8 is being displayed on the terminal display module 24, the reception processing module 211 of the player terminal 20 receives selection operation input from the player by having the player select one of the plurality of player characters 54 to 58 (S101).

Next, the determination module 212 determines whether the selection operation input from the player is a first selection operation input based on a first selection operation (flick) by the player, or a second selection operation input based on a second selection operation (tap) by the player (S102). More specifically, when the player performs a selection operation on the touch panel, the touch operation input of the player on the game screen 50 is detected. The determination module 212 then determines whether that selection operation was a flick or a tap on the basis of detected information from the touch panel.

Next, if it has been determined from the determination results of Step 102 that a second selection operation input was received, the determination module 212 determines whether or not the player character selected by the player is a player character already configured as a selectable object.

If it is not a player character that has already been configured as a selectable object (S103: NO), the selected character configuration processing module 213 configures the player character selected by the player as a selectable object (S104), and configures an ordinary attack for that player character (S105). The selected character configuration processing module 213 here stores this configuration information in the terminal memory 22.

On the other hand, if the player character has already been configured as a selectable object (S103: YES), the selected character configuration processing module 213 permits cancellation of the selection of the player character that has already been configured as a selectable object (S106). The selected character configuration processing module 213 here updates the configuration information stored in the terminal memory 22 so that this player character will be excluded from the selectable objects.

Next, if it is determined from the determination results in Step 102 that a first selection operation input has been received, it is determined whether or not a specific condition has been met (S107). Specifically, the determination module 212 determines whether or not the skill parameter configured for the selected player character (see FIG. 6) has reached its maximum value. If it is determined that the specific condition has not been met (S107: NO), the first selection operation input is cancelled without being permitted, and the flow returns to Step 101. On the other hand, if it is determined that the specific condition has been met (S107: YES), the selected character configuration processing module 213 configures the player character selected by the player as a selectable object (S108), and configures a special attack for that player character (S109). The selected character configuration processing module 213 at this point stores this configuration information in the terminal memory 22.

Next, when a player character is thus selected, the determination module 212 determines whether or not the number of selected player characters has reached the maximum number (S110). In this embodiment, as shown in FIG. 11, three player characters can be placed in the game field area 51, so the maximum number is "3."

If the number of player characters has not reached the maximum number (S110: NO), the flow returns to Step 101, and various processing is repeated until the number of player characters reaches the maximum number.

On the other hand, if the number of player characters has reached the maximum number (S110: YES), the selected character configuration processing module 213 confirms the player characters configured as selectable objects once the maximum number has been reached, and confirms the actions (special attack or ordinary attack) configured for each of the player characters (S111).

As discussed above, with the game program pertaining to this embodiment, when the character placement area 53 is being displayed on the game screen 50, the player selects one of the plurality of player characters 54 to 58, and a first selection operation input or second selection operation input is received from the player. If the first selection operation input is received, the player character selected by the player is configured as a selectable object, and a special attack is configured for that player character. If the second selection operation input is received, the player character selected by the player is configured as a selectable object, and an ordinary attack is configured for that player character. Consequently, selection of the player character and selection of the action for that player character can be performed simultaneously by the player with a single selection operation, and this facilitates the selection operations performed by the player.

===Other Embodiments===

The above embodiment is intended to facilitate an understanding of the present invention, and should not be construed as limiting of the present invention. The present invention can be modified and improved without departing from the gist thereof, and the present invention includes equivalents thereof. In particular, the embodiments discussed below are encompassed by the present invention.

<First Selection Operation Input and Second Selection Operation Input>

An example was given in which the first selection operation was performed by flicking the position of a character displayed on the game screen 50, and an example was given in which the second selection operation was performed by tapping the position of the character displayed on the game screen 50, but the present invention is not limited thereto. For example, the player may continue pressing the position of a character displayed on the game screen 50 for a specific length of time, or may double tap the game screen 50.

<Various Kinds of Special Attack>

In the above embodiment, an example was given in which the character was selected and either ordinary attack or special attack was selected by flicking the position of the player character displayed on the game screen 50, but the present invention is not limited thereto. For instance, in addition to the selection of a character and the selection of a special attack, the type of special attack can also be selected at the same time. More specifically, if a special attack (lethal technique) has been configured for a player character, the player may select the type of special attack by changing the slide direction of the flick. For example, a special attack of lethal technique A will be configured for the selected character if the player slides his finger from bottom to top in the up and down direction of the game screen, a special attack of lethal technique B will be configured if he slides his finger from top to bottom, a special attack of lethal technique C will be configured if he slides his finger from right to left in the left and right direction of the game screen, and a special attack of D will be configured if he slides his finger from left to right. One of four different special attacks can be selected in this manner. That is, the player can flick in one of four directions and thereby change the special attack performed by a player character, even though the same player character is selected.

<Specific Condition>

In the above embodiment, an example of a specific condition was given above in which a skill parameter configured for a player character reached a maximum value, but the present invention is not limited thereto. For example, the specific condition may be that the player character receives a certain amount of damage from an enemy character (the hit point parameter of the player character is reduced by a certain amount), or that a certain amount of damage is inflicted on an enemy character (the hit point parameter of the enemy character is reduced by a certain amount), or that at least a specific number of enemy characters are defeated.

<Server Device>

In the above embodiment, an example was given in which the game system 1 equipped with a single server device 10, as an example of a server device, but this is not the only option, and another example of a server device is a game system 1 equipped with a plurality of server devices 10. Specifically, a plurality of server devices 10 are connected via a network 2, and various kinds of processing is distributed among the server devices 10.

<Information Processing Device>

With the game system 1 in the above embodiment, an example was given in which the player terminals 20 executed various kinds of information processing on the basis of a game program, but this is not the only option, and the server device 10 alone may execute the above-mentioned various kinds of information processing on the basis of a game program.

Also, the configuration may be such that the server device 10 takes on part of the function as an information processing device. In this case, the server device 10 and the player terminals 20 constitute an information processing device. It should be noted that the information processing device is an example of a computer.

DESCRIPTION OF THE REFERENCE NUMERALS

1 Game system
2 Network
10 Server device
11 Control module
12 Memory
13 Input module
14 Display module
15 Communication module
20 Player terminal
21 Terminal control module
22 Terminal memory
23 Terminal input module
24 Terminal display module
25 Terminal communication module
50 Game screen
51 Game field area
52 Enemy character
53 Character placement area
54 Player character
54A Player character
55 Player character
55A Player character
56 Player character
57 Player character
57A Player character
58 Player character
211 Reception processing module
212 Determination processing module
213 Selected character configuration processing module
214 Character placement module
215 Game progress processing module
216 Screen generation processing module
M mark

The invention claimed is:

1. A non-transitory computer-readable recording medium that continuously stores operations executed by a computer comprising a processor and a memory, wherein the operations cause the computer to execute:

screen generation processing to generate a game screen including a character placement area in which a plurality of characters that can be selected by a player are placed;

reception processing to receive selection operation input from the player by having the player select one of the plurality of characters when the character placement area is being displayed on the game screen;

determination processing to determine whether the received selection operation input is a first selection operation input or a second selection operation input; and selected character configuration processing to configure the character selected by the player as a selectable object and configure a first action for the character that is the selectable object, the first action indicative of a first type of attack that is to be executed by the character that is the selectable object, when it has been determined that the first selection operation input has been received, and to configure the character selected by the player as the selectable object and configure a second action indicative of a second type of attack that is different from the first type of attack of the first action for the character that is the selectable object, when it has been determined that the second selection operation input has been received, wherein the screen generation processing generates the game screen that includes a game field area in which the characters determined as selectable objects are placed until a maximum number of characters is reached, the selected character configuration processing enables cancellation of the selection of the characters configured as the selectable objects until the characters placed in the game field area reach the maximum number, and once the characters placed in the game field area have reached the maximum number, the characters configured as the selectable objects are confirmed, and the first action or the second action configured for each character is confirmed.

2. The non-transitory computer-readable recording medium according to claim 1, wherein the screen generation processing generates the game screen that differentiates characters that satisfy a specific condition with characters that do not satisfy the specific condition in the character placement area, the determination processing determines whether or not the received second selection operation input is a selection operation input for selecting characters that satisfy the specific condition from among characters that satisfy the specific condition and characters that do not satisfy the specific condition, the selected character configuration processing configures as the selectable object the character that satisfies the specific condition selected by the player and configures the second action for the character that is the selectable object, when it has been determined that the selection operation input is to select the character that satisfies the specific condition, and does not configure as the selectable object the character that does not satisfy the specific condition selected by the player, when it has been determined that the selection operation input is to select a character that does not satisfy the specific condition.

3. The non-transitory computer-readable recording medium according to claim 2, wherein, when one of the plurality of characters placed in the character placement area has satisfied the specific condition, the screen generation processing performs a special display indicating that said character has satisfied the specific condition.

4. An information processing device, comprising:

a screen generation processing module that generates a game screen including a character placement area in which a plurality of characters that can be selected by a player are placed;

a reception processing module that receives selection operation input from the player by having the player select one of the plurality of characters when the character placement area is being displayed on the game screen;

a determination processing module that determines whether the received selection operation input is a first selection operation input or a second selection operation input; and a selected character configuration processing module that configures the character selected by the player as a selectable object and configures a first action for the character that is the selectable object, the first action indicative of a first type of attack that is to be executed by the character that is the selectable object, when it has been determined that the first selection operation input has been received, and that configures the character selected by the player as the selectable object and configures a second action indicative of a second type of attack that is different from the first type of attack of the action for the character that is the selectable object, when it has been determined that the second selection operation input has been received, wherein the screen generation processing module generates the game screen that includes a game field area in which the characters determined as selectable objects are placed until a maximum number of characters is reached, the selected character configuration processing module enables cancellation of the selection of the characters configured as the selectable objects until the characters placed in the game field area reach the maximum number, and once the characters placed in the game field area have reached the maximum number, the characters configured as the selectable objects is confirmed, and the first action or the second action configured for each character is confirmed.

5. The non-transitory computer-readable recording medium of claim 1, wherein the first selection operation input is a first type of input made to a client device, wherein the second selection operation input is a second type of input made to the client device that is different from the first type of input.

6. The information processing device of claim 4, wherein the first selection operation input is a first type of input made to a client device, wherein the second selection operation input is a second type of input made to the client device that is different from the first type of input.

* * * * *